(12) United States Patent
Sebastian et al.

(10) Patent No.: US 11,452,891 B2
(45) Date of Patent: Sep. 27, 2022

(54) PLEATED FILTER ELEMENT COMPRISING PLEATED FILTER MEDIA WITH EDGE DAMS, AND METHOD OF MAKING AND USING

(71) Applicant: 3M INNOVATIVE PROPERTIES COMPANY, St. Paul, MN (US)

(72) Inventors: John M. Sebastian, Oakdale, MN (US); Christopher A. Hurley, Athens (CA); Kenneth J. Krepel, St. Paul, MN (US); Pierre Legare, Brockville (CA); Fuming B. Li, Woodbury, MN (US); Paul A. Martinson, Maplewood, MN (US); Bong Y. Yeom, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 425 days.

(21) Appl. No.: 16/282,774

(22) PCT Filed: Aug. 15, 2017

(86) PCT No.: PCT/US2017/046965
§ 371 (c)(1),
(2) Date: Feb. 22, 2019

(87) PCT Pub. No.: WO2018/038976
PCT Pub. Date: Mar. 1, 2018

(65) Prior Publication Data
US 2019/0299035 A1    Oct. 3, 2019

Related U.S. Application Data

(60) Provisional application No. 62/379,958, filed on Aug. 26, 2016.

(51) Int. Cl.
*A62B 23/02* (2006.01)
*B01D 46/00* (2022.01)
(Continued)

(52) U.S. Cl.
CPC .......... *A62B 23/02* (2013.01); *B01D 46/0001* (2013.01); *B01D 46/10* (2013.01);
(Continued)

(58) Field of Classification Search
CPC .... A62B 23/02; B01D 46/0001; B01D 46/10; B01D 46/103; B01D 46/521; B01D 2275/10
(Continued)

(56) References Cited

U.S. PATENT DOCUMENTS

| | | |
|---|---|---|
| 3,237,387 A | 3/1966 | Haugen |
| 3,871,851 A | 3/1975 | Neumann |

(Continued)

FOREIGN PATENT DOCUMENTS

| | | |
|---|---|---|
| CA | 2428868 | 9/2002 |
| CN | 203842409 | 9/2014 |

(Continued)

OTHER PUBLICATIONS

"Hollingsworth & Vose", Technical Data Sheet, HE14732A, Air Filtration/HVAC, 2014, p. 1.
(Continued)

*Primary Examiner* — Robert A Hopkins
*Assistant Examiner* — Qianping He
(74) *Attorney, Agent, or Firm* — Kenneth B. Wood (57) ABSTRACT

A pleated filter element comprising a pleated filter media comprising a plurality of oppositely-facing pleats with a pleat direction and with a plurality of upstream and downstream pleat tips and pleat valleys, wherein the pleated filter media comprises two corrugated edges and two noncorru-
(Continued)

gated edges. The first (second) corrugated edge of the pleated filter media comprises an edge dam of hardened adhesive that occupies the upstream and downstream pleat valleys at a location laterally inwardly proximate the first (second) corrugated edge and that extends along an entire longitudinal extent of the pleated filter media. The pleated filter media is a multilayer media comprising an organic polymeric nonwoven web, that exhibits a Percent Penetration of less than 5, laminated with a fiberglass prefilter layer that is disposed upstream of the primary filtration layer and that exhibits a Percent Penetration of greater than about 70.

18 Claims, 3 Drawing Sheets

(51) Int. Cl.
  *B01D 46/10* (2006.01)
  *B01D 46/52* (2006.01)
(52) U.S. Cl.
  CPC ......... *B01D 46/103* (2013.01); *B01D 46/521* (2013.01); *B01D 2275/10* (2013.01)
(58) Field of Classification Search
  USPC ........................................................ 55/497
  See application file for complete search history.

(56) References Cited

U.S. PATENT DOCUMENTS

| | | | |
|---|---|---|---|
| 4,215,682 A | 8/1980 | Kubik | |
| RE30,782 E | 10/1981 | Van Turnhout | |
| 4,462,399 A | 7/1984 | Braun | |
| 4,877,433 A | 10/1989 | Oshitari | |
| 5,230,800 A | 7/1993 | Nelson | |
| 5,427,597 A | 6/1995 | Osendorf | |
| 5,672,399 A | 9/1997 | Kahlbaugh | |
| 5,792,229 A * | 8/1998 | Sassa | B01D 46/103 |
| | | | 55/497 |
| 5,800,586 A | 9/1998 | Cusick | |
| 5,814,219 A * | 9/1998 | Friedmann | B01D 29/111 |
| | | | 210/493.3 |
| 5,834,528 A | 11/1998 | Tanaka | |
| 5,863,482 A | 1/1999 | Schlor | |
| 5,910,277 A | 6/1999 | Ishino | |
| 6,165,241 A | 12/2000 | Choi | |
| 6,165,572 A | 12/2000 | Kahlbaugh | |
| 6,171,684 B1 | 1/2001 | Kahlbaugh | |
| 6,231,646 B1 * | 5/2001 | Schweizer | B03C 3/28 |
| | | | 96/17 |
| 6,309,438 B1 | 10/2001 | Kanno | |
| 6,416,562 B1 | 7/2002 | Shibuya | |
| 6,579,350 B2 | 6/2003 | Doherty | |
| 6,596,109 B2 | 7/2003 | Posa | |
| 7,887,889 B2 | 2/2011 | David | |
| 7,896,940 B2 | 3/2011 | Sundet | |
| 7,989,371 B2 | 8/2011 | Angadjivand | |
| 7,993,427 B2 | 8/2011 | Hassmann | |
| 8,162,153 B2 | 4/2012 | Fox | |
| 8,197,569 B2 | 6/2012 | Healey | |
| 8,419,817 B2 | 4/2013 | Sundet | |
| 8,545,607 B2 | 10/2013 | Cambo | |
| 8,679,217 B2 | 3/2014 | Chi | |
| 2001/0000584 A1 * | 5/2001 | Spengler | B29C 53/36 |
| | | | 156/309.6 |
| 2002/0166312 A1 * | 11/2002 | Phelps | F02M 35/024 |
| | | | 55/497 |
| 2003/0070406 A1 | 4/2003 | Duffy | |
| 2004/0011204 A1 | 1/2004 | Both | |
| 2004/0112023 A1 * | 6/2004 | Choi | B01D 46/10 |
| | | | 55/486 |
| 2004/0255783 A1 | 12/2004 | Graham | |
| 2005/0132682 A1 | 6/2005 | Paul | |
| 2005/0284807 A1 | 12/2005 | Mees | |
| 2006/0005518 A1 * | 1/2006 | Duffy | B01D 46/523 |
| | | | 55/497 |
| 2007/0272082 A1 * | 11/2007 | Johansson | B01D 46/0086 |
| | | | 96/417 |
| 2007/0289273 A1 | 12/2007 | Boyd | |
| 2008/0038976 A1 | 2/2008 | Berrigan | |
| 2009/0064648 A1 * | 3/2009 | Chi | B01D 46/10 |
| | | | 55/527 |
| 2009/0272084 A1 * | 11/2009 | Healey | B01D 39/1623 |
| | | | 55/487 |
| 2010/0326028 A1 * | 12/2010 | Sundet | B01D 46/523 |
| | | | 55/499 |
| 2011/0126713 A1 * | 6/2011 | Legare | B01D 46/103 |
| | | | 55/467 |
| 2011/0209622 A1 | 9/2011 | Hiner | |
| 2011/0290119 A1 | 12/2011 | Ylitalo | |
| 2013/0280474 A1 * | 10/2013 | Medina | A44B 18/0069 |
| | | | 428/99 |
| 2014/0366732 A1 | 12/2014 | Gao | |
| 2015/0122127 A1 | 5/2015 | Lans | |
| 2015/0273383 A1 * | 10/2015 | Zhang | B01D 46/0005 |
| | | | 55/497 |
| 2015/0375156 A1 * | 12/2015 | Sullivan | B01D 29/012 |
| | | | 55/496 |
| 2016/0129381 A1 | 5/2016 | Gao | |
| 2016/0175752 A1 * | 6/2016 | Jaganathan | B01D 46/62 |
| | | | 55/486 |
| 2016/0367924 A1 | 12/2016 | Motomura | |

FOREIGN PATENT DOCUMENTS

| | | |
|---|---|---|
| CN | 203842409 U * | 9/2014 |
| CN | 104492198 | 4/2015 |
| CN | 104524896 | 4/2015 |
| CN | 204411971 | 6/2015 |
| EP | 0159698 | 10/1985 |
| JP | 08089737 | 4/1996 |
| JP | 2001-232130 | 8/2001 |
| JP | 3331651 | 10/2002 |
| JP | 2006-089586 | 4/2006 |
| JP | 2011194389 | 10/2011 |
| JP | 4919254 | 2/2012 |
| JP | 2013-146670 | 8/2013 |
| WO | WO 99/16534 | 4/1999 |
| WO | WO 2011-022382 | 2/2011 |
| WO | WO 2015-199972 | 12/2015 |
| WO | WO 2016-033097 | 3/2016 |
| WO | WO 2017-004313 | 1/2017 |

OTHER PUBLICATIONS

"Hollingsworth & Vose", Technical Data Sheet, HF117312A, Air Filtration/HVAC, 2014, p. 1.
"Hollingsworth & Vose", Technical Data Sheet, HF13732A, Air Filtration/HVAC, 2014, p. 1.
"Hovoglas® Filter Media", Technical Data Grade, HF-0121 Series, 2001, p. 1.
International Search Report for PCT International Application No. PCT/US2017/046965, dated Oct. 2, 2017, 6 pages.

* cited by examiner

PLEATED FILTER ELEMENT COMPRISING PLEATED FILTER MEDIA WITH EDGE DAMS, AND METHOD OF MAKING AND USING

BACKGROUND

Respirators are often used for cleansing air to be breathed by a user, and commonly include a mask body along with one or more filter elements that are fluidly connected to the mask body.

SUMMARY

In broad summary, herein is disclosed a pleated filter element comprising a pleated filter media with first and second corrugated edges and with first and second edge dams of hardened adhesive. These and other aspects will be apparent from the detailed description below. In no event, however, should this summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Glossary

Although terms such as "top", bottom", "upper", lower", "under", "over", "up" and "down", and "first" and "second" may be used in this disclosure, it should be understood that those terms are used in their relative sense only unless otherwise noted. As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match.

The term "upstream" is used to denote the side of an entity (e.g. a pleated air filter media) from which moving air impinges on the entity; the term "downstream" is used to denote the side of an entity through which air exits the entity. Terms such as inward, outward, outermost, and the like, are with reference to the upstream-downstream direction of the pleated filter media. The term "lateral", and terms such as e.g. "laterally inward" and the like, are with reference to a direction along the Pleat Direction of the pleated air filter media, as discussed in detail herein.

The term "dam" refers to a partition collectively provided by hardened adhesive that is present in both upstream pleat valleys and downstream pleat valleys of a pleated filter media.

The term "seal" refers to an edge dam that fills upstream and downstream pleat valleys sufficiently to occlude a corrugated edge of the pleated filter media.

By "occlude", "occlusive", and like terms is meant to block so that at least substantially no air can flow therethrough.

DETAILED DESCRIPTION

Figure 1:
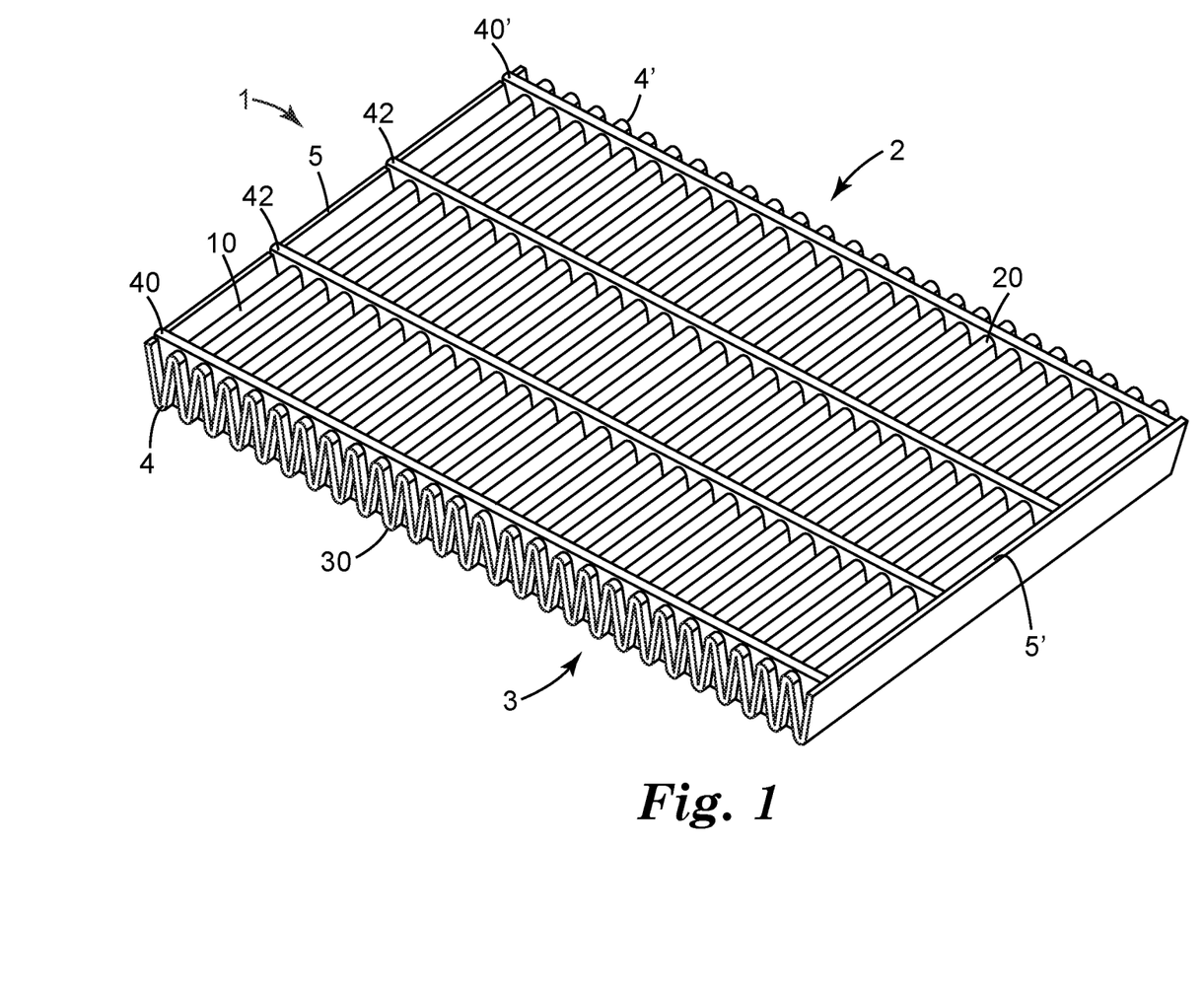
FIG. 1 is a perspective upstream/side view of an exemplary pleated filter element.

Shown in FIG. 1 in perspective view from the upstream side is an exemplary pleated filter element 1 comprising pleated air filter media 10. A portion of an exemplary filter element 1 is shown in side view in FIG. 2. In some embodiments filter element 1 may be rectangular in shape (which specifically includes square shapes) with e.g. four corners; in such embodiments pleated filter media 10 may thus have a generally rectangular perimeter (which does not preclude irregularities, notches, chamfered or angled corners, or the like, in the perimeter of filter media 10). Pleated filter media 10 (and filter element 1) comprises major edges, e.g. four major edges as shown in FIG. 1. Major edges (ends) 4 and 4' (which terminate as exposed pleats) will be referred to herein as corrugated edges, and major edges (ends) 5 and 5' will be referred to as noncorrugated edges, all as shown in FIG. 1.

Filter element 1 comprises an upstream major side 2 and a downstream major side 3; pleated filter media 10 thus comprises an upstream major face 25 and a downstream major face 35. In some embodiments, filter element 1 may be upstream-downstream symmetrical (e.g., filter element 1 may be installed in a filter element housing with either major side oriented upstream); in such cases the designation of upstream and downstream sides/faces is interchangeable. In other embodiments, however, filter element 1 is not symmetrical in this manner and the designation of upstream and downstream sides and faces is not interchangeable.

Pleated filter media 10 may be made from any suitable media and may be configured to filter (e.g., capture) particles, vapors, or gases, or any combination thereof. Potentially suitable materials may include e.g. paper; porous films of thermoplastic or thermoset materials; microporous membranes such as phase-inversion membranes, organic polymeric nonwoven webs (such as melt blown or spunbond webs, carded webs, wet-laid or air-laid webs, and so on) of synthetic or natural fibers; scrims; woven or knitted materials; foams; fiberglass media; or laminates or composites of two or more materials. A nonwoven organic polymeric web comprised of polyethylene, polypropylene or poly(lactic acid) may be suitable, for example. Any suitable method of making a nonwoven web (e.g., melt-blowing, melt-spinning, carding, and so on) may be used. In particular embodiments, the nonwoven web may be a blown microfiber (BMF) web, meaning that the fibers are meltblown and exhibit an Effective Fiber Diameter of less than 30 µm. Filter media 10 may also include sorbents, catalysts, and/or activated carbon (granules, fibers, fabric, and molded shapes).

In specific embodiments, pleated filter media 10 may comprise at least one layer that comprises an electret material. By an electret material is meant a material (e.g. an organic polymeric material) that, after a suitable charging processes, exhibits a quasi-permanent electric charge. The electric charge may be characterized by an X-ray Discharge Test as disclosed e.g. in U.S. Patent Publication No. 2011-0290119. Such a material may be chosen from any suitable material, e.g. split fibrillated charged fibers as described in U.S. Pat. RE 30782. Such charged fibers can be formed into a nonwoven web by any suitable means and can be optionally joined to a scrim such as disclosed in U.S. Pat. No. 5,230,800. In other specific embodiments, filter media 10 can be a melt blown microfiber nonwoven web (e.g. of the general types disclosed in U.S. Pat. Nos. 4,215,682 and 7,989,371) or a spunbond nonwoven web, that may include at least some fibers that comprise electrets. Such a web can optionally be joined to a secondary layer during web formation, or subsequently joined to a secondary layer in any conventional manner if desired. Filter media that may be particularly suitable for certain applications might include e.g. media of the general type described in U.S. Pat. No. 8,162,153 to Fox; media of the general type described in U.S. Patent Application Publication 20080038976 to Berrigan; media of the general type described in U.S. Patent Application Publication 20040011204 to Both; and media generally known as tribocharged media. Any such media can be charged to provide charged electret moieties if desired. Any suitable charging method may be used, chosen from e.g. corona charging, hydrocharging, tribocharging, and so on. In some embodiments, a filter media may be formed from pre-charged electret fibers; or, a filter media may be formed (e.g. collected as a nonwoven web and consolidated if desired, or formed into a membrane) and then post-charged. If desired, the media may comprise one or more charging additives, e.g. chosen from any of the additives described in International Patent Publication WO2016/033097. In some embodiments, a media comprising charged electret moieties can also comprise a fluorinated surface treatment e.g. of the type disclosed in U.S. Pat. No. 7,887,889 to David; such treatments may e.g. improve the performance of the media when exposed to oily mists and the like.

In various embodiments, any such filter media may exhibit a thickness of less than about 2.0, 1.5, 1.2, 1.0, 0.8, 0.6, 0.5, or 0.4 mm. In various embodiments, any such filter media may exhibit a basis weight of from at least about 10, 20, or 30 grams per square meter ($g/m^2$), to at most about 120, 100, 80, or 60 $g/m^2$. In various embodiments, the media may exhibit a pressure drop that is greater than about 1.0, 2.0, 4.0, or 8.0 mm of water (measured according to the procedures disclosed in the Working Examples). In further embodiments, the media may exhibit a pressure drop that is less than about 20, 15, or 10 mm of water. In various embodiments, the media may exhibit a Percent Penetration (i.e., DOP initial Percent Penetration, measured according to the procedures disclosed in the Working Examples) of less than about 20, 10, 5.0, 2.0, 1.0, 0.4, 0.2, 0.1, or 0.05. (The above-listed parameters will be total/overall parameters, in the particular case of a media that is a multilayer media as described below.)

Multilayer Media

In some embodiments multilayer media, e.g. laminated media, can be used as filter media 10. In particular embodiments, such media may comprise at least one primary filtration layer e.g. of any media discussed above (e.g. a meltblown microfiber web or a spunbonded web or a microporous membrane, optionally comprising charged electret moieties) laminated to one or more layers of other material. For example, a highly open plastic netting or mesh, a nonwoven scrim, etc., might be laminated to the media (and then pleated along with the media) e.g. in order to enhance the abrasion resistance of the media. Any such layer may be laminated to a primary filtration layer by any suitable method, e.g. by melt-bonding, by way of an adhesive (hot melt adhesive, pressure-sensitive adhesive, and so on), calendering or ultrasonic point-bonding, etc. In specific embodiments, the lamination may use a hot-melt adhesive that is applied (e.g. by spraying, roll coating, or any suitable method) so as to not unacceptably increase the flow resistance of the media. Thus in various embodiments, layers of a multilayer media may be adhesively laminated together by way of an adhesive that is provided at a coating weight of less than about 10, 8, or 6 grams per square meter.

In various embodiments, a primary filtration layer (e.g. an organic polymeric nonwoven web e.g. comprising charged electret moieties) of a multilayer media may comprise a thickness of less than about 2.0, 1.5, 1.0, 0.8, 0.6, or 0.4 mm. In various embodiments, a primary filtration layer may exhibit a basis weight of from at least about 10, 20, or 30 $g/m^2$, to at most about 100, 80, 60, or 40 $g/m^2$. In various embodiments, a primary filtration layer may exhibit a pressure drop that is greater than at least about 1.0, 2.0, 4.0, or 8.0 mm of water, and that is less than about 20, 16, 12, or 10 mm of water. In various embodiments, a primary filtration layer may exhibit a Percent Penetration of less than about 20, 10, 5.0, 2.0, 1.0, 0.4, 0.2, 0.1, or 0.05.

In some embodiments, a multilayer media may include at least one layer that comprises a sorbent (e.g. activated carbon) e.g. for reducing the amount of nuisance odors and the like. In some embodiments, a multilayer media may comprise at least one prefilter layer that is on the upstream side of the media. In some embodiments, such a prefilter layer may preferentially capture relatively large particles while allowing smaller particles to pass therethrough so that they may be captured by the primary filtration layer. Such a prefilter layer may comprise e.g. polypropylene, polyethylene, polyethylene terephthalate, poly(lactic acid), or blends of these materials.

It has been found that it may be advantageous for a prefilter layer to exhibit a Percent Penetration that is significantly higher than that of a primary filtration layer with which the prefilter layer is used. That is, in some embodiments a laminate of a primary filtration layer with a relatively low Percent Penetration (e.g. below 5.0) and a prefilter layer with a relatively high Percent Penetration (e.g. of 70 or more) may advantageously exhibit a much less pronounced increase in flow resistance (as manifested by pressure drop through the laminate) during use of the filter media, than that exhibited by the primary filtration layer used alone. Such behavior (which may be ascertained by comparison of a final pressure drop with an initial pressure drop) has not been found when using a prefilter layer with a relatively low Percent Penetration (e.g. less than 70).

In various embodiments, a prefilter layer may exhibit a Percent Penetration of greater than about 20, 40, 60, 70, 80, 90, or 95. In various embodiments, any such prefilter layer may be combined with a primary filtration layer that exhibits a Percent Penetration of less than about 10, 5.0, 2.0, 1.0, 0.4, 0.2, 0.1, or 0.05. A laminate of at least one primary filtration layer and at least one prefilter layer may, in various embodiments, exhibit a Percent Penetration of less than about 10, 5.0, 4.0, 2.0, 1.0, 0.4, 0.2, 0.1, or 0.05. In various embodiments, a prefilter layer may comprise a thickness of less than about 2.0, 1.5, 1.0, 0.8, 0.6, or 0.4 mm. In various embodiments, a prefilter layer may exhibit a basis weight of from at least about 20, 30, 40, or 50 $g/m^2$, to at most about 120, 100, 80, or 60 $g/m^2$. In various embodiments, a prefilter layer may exhibit a pressure drop that is less than 4.0, 3.0, 2.0, 1.5, or 1.0 mm of water (tested at face velocity of 14 cm/s).

In particular embodiments a multilayer media may comprise a fiberglass layer. In some embodiments, such a fiberglass layer may take the form of a prefilter layer. In particular embodiments in which the fiberglass prefilter layer exhibits a Percent Penetration that is significantly higher than that of a primary filtration layer with which the fiberglass prefilter layer is used, the above-described advantages in filtration performance may result. However, a fiberglass layer does not necessarily have to function as a prefilter layer in order to provide benefits. (In other words, in some embodiments a fiberglass layer may be on the downstream side of a primary filtration layer and thus may not function as a prefilter; in other embodiments, fiberglass layers may be provided on both the upstream and downstream sides of a primary filtration layer.)

Specifically, it has been found that a fiberglass layer, when combined with a primary filtration layer that is an organic polymeric nonwoven web (e.g. a spunbond web or BMF web), can allow the pleatability of the resulting laminate to be significantly enhanced over that exhibited by the primary filtration layer alone. That is, the inclusion of a fiberglass layer can allow an organic polymeric nonwoven web to be pleated to a relatively tight pleat configuration (e.g. a pleat spacing of less than about 3 mm in combination with a pleat height of greater than about 10 mm), in comparison to the organic polymeric nonwoven web alone. (This can be particularly true for e.g. BMF webs, which are characteristically rather soft and limp and thus not amendable to being aggressively pleated.)

Furthermore, combining a fiberglass layer with an organic polymeric nonwoven web can provide enhanced physical durability over fiberglass layers when used alone. Although fiberglass filtration layers are known in the art, are readily pleatable to a relatively tight pleat configuration due to their inherent stiffness and rigidity, and have been used alone e.g. in pleated filter media, they can be susceptible to being damaged (e.g. cracked) e.g. if inadvertently subjected to a deforming force, due to their inherent rigidity. (In other words, their inherent rigidity can render them somewhat brittle.) The presence of a relatively compliant and resilient organic polymeric nonwoven web (such as e.g. a BMF web) can provide a cushioning effect that may minimize any chance of the fiberglass layer being damaged.

It will thus be appreciated that embodiments that comprise a primary filtration layer that is an organic polymeric material web (e.g. a nonwoven web or a microporous membrane), and that comprise a fiberglass layer e.g. in the form of a prefilter layer, can provide enhanced pleatability and enhanced durability in addition to the above-described advantages in filtration performance. In some embodiments, the multilayer filtration media consists essentially of, or consists of, a primary filtration layer that is an organic polymeric nonwoven web, that is laminated, e.g. adhesively laminated, together with a fiberglass layer.

In particular embodiments, a multilayer filtration media as disclosed herein may comprise a primary filtration layer (e.g. an organic polymeric layer such as e.g. a nonwoven web or a microporous membrane) of relatively low stiffness, in combination with (e.g., laminated together with) an additional layer (e.g. a fiberglass layer) of relatively high stiffness. In some embodiments, the multilayer filtration media consists essentially of, or consists of, a primary filtration layer of relatively low stiffness in combination with an additional layer of relatively high stiffness. The stiffness of the media may be characterized by a Gurley Stiffness (measured as described in the Working Examples herein). In various embodiments, a multilayer filtration media as disclosed herein may comprise a primary filtration layer that exhibits a Gurley Stiffness (measured individually) of less than 120, 100, 80, 60, 40, or 30 mg. In further embodiments, a multilayer filtration media as disclosed herein may include a primary filtration layer of such stiffness, along with an additional layer (e.g. a fiberglass prefilter layer) that exhibits a Gurley Stiffness (measured individually) of at least 200, 300, 400, 600, 800, or 1000 mg.

The stiffness of a primary filtration layer relative to an additional layer (e.g. a prefilter layer) may be characterized by way of the ratio of the Gurley Stiffness of the additional layer, to that of the primary filtration layer. For example, if a primary filtration layer has a Gurley Stiffness of 25 mg (measured individually) and an additional layer has a Gurley Stiffness of 250 mg (measured individually), the ratio will be 10 (dimensionless). In various embodiments, such a ratio (of individually measured values) may be at least about 2.0, 2.5, 3.0, 4.0, 6.0, 8.0, 10, 16, or 20.

In various embodiments, a multilayer filtration media as disclosed herein may exhibit a Gurley Stiffness (measured as an unpleated multilayer laminate) of at least about 200, 300, 400, 500, 600, 700, 800, 900, or 1000 mg. It has been found that lamination of a primary filtration layer that exhibits a relatively low Gurley Stiffness (e.g. less than 50 mg) together with an additional layer that exhibits a relatively high Gurley Stiffness (e.g. greater than 200 mg) can, in at least some instances, produce a laminate that exhibits a Gurley Stiffness that is higher, e.g. significantly higher, than that of either of the individual layers. For example, the Working Examples describe an instance in which a primary filtration layer with a Gurley Stiffness of approximately 23 mg was laminated together with a prefilter layer with a Gurley Stiffness of approximately 250 mg. The resulting laminate exhibited a Gurley Stiffness of approximately 490 mg. Thus in various embodiments, a multilayer filter media as described herein may exhibit a Gurley Stiffness that is higher than the Gurley Stiffness of the layer of the media that exhibits the highest individual Gurley Stiffness, by a factor of at least about 1.4, 1.8, or 2.2. (In the preceding example, such a ratio will be 490/250 or approximately 2.0.)

In some embodiments, a pleated filter element as disclosed herein may comprise a multilayer filtration media that includes a primary filtration layer (e.g. an organic polymeric microporous membrane or an organic polymeric nonwoven web) that is so limp and compliant that it is not rotary-score pleatable (in the absence of having a layer of relatively stiff material laminated thereto as disclosed herein). An ordinary artisan will appreciate that a candidate filtration material may be put through a rotary-score pleating process and it can be readily determined whether the material, by itself, is rotary-score pleatable. (For purposes of such characterization, a pleat spacing of no more than 3 mm, and a pleat height of at least 10 mm, may be used.)

Fiberglass materials that may be suitable for inclusion in a multilayer filtration media as disclosed herein include e.g. the products available from Hollingsworth and Vose under the trade designations HF-13732A, HE-14732A, and HE-1073. Fiberglass materials that exhibit a relatively high Percent Penetration (and that thus may be particularly suitable for use as a prefilter layer) include the products available from Hollingsworth and Vose under the trade designations HF-11732A and HF-0121. In some embodiments, a multilayer filtration media consists essentially of, or consists of, an organic polymeric primary filtration layer that comprises charged electret moieties, in combination with a fiberglass prefilter layer.

Pleated Filter Media

As noted above, filter media 10 is pleated. In at least some embodiments, pleated filter media 10 does not comprise any type of planar reinforcing structure or support layer (e.g., strips of chipboard, a layer of wire mesh, a nonwoven scrim, etc.) that is bonded to pleat tips of a major side of the pleated filter media to stabilize the pleat spacing. Moreover, in at least some embodiments pleated filter media 10 does not comprise any kind of protective layer or support layer (e.g. a wire mesh, a polymeric netting, or a non-woven scrim) that is pleated along with the pleated filter media and that does not perform a filtering function (e.g., that exhibits a Percent Penetration of greater than 99.0). That is, in some embodiments the herein-disclosed hardened adhesive dams (described later) can provide sufficient mechanical integrity of the pleated filter media that no such support layer or layers may be needed. Thus in some embodiments, filter element 1 may consist essentially of, or consist of, a pleated multilayer filter media comprising an organic polymeric nonwoven layer and a fiberglass prefilter layer, along with adhesive dams, without any other component being present. In particular embodiments, the pleats of filter media 10 do not comprise any dimples of the type described e.g. in U.S. Pat. No. 5,427,597.

Figure 2:
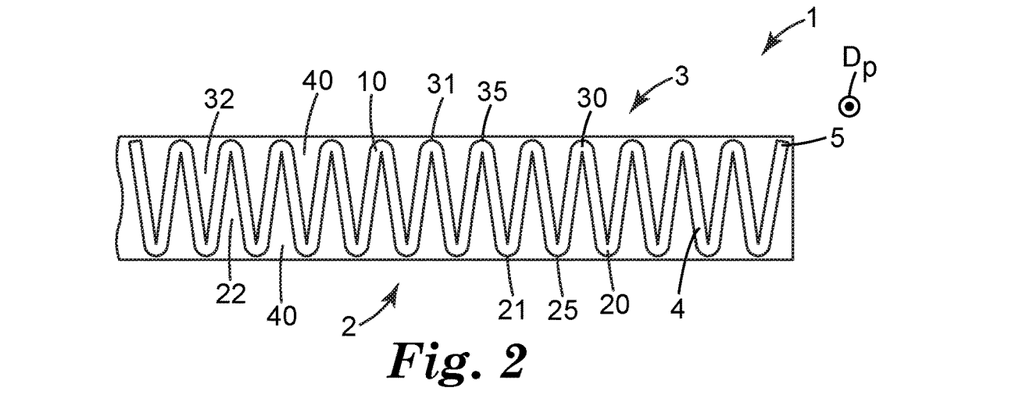
FIG. 2 is a side view of a portion of an exemplary pleated filter element.

As shown in FIGS. 1 and 2, pleated filter media 10 comprises a plurality of upstream pleats 20 and downstream pleats 30. Each upstream pleat 20 comprises an upstream pleat tip 21 and each adjacent pair of upstream pleats 20 defines an upstream pleat valley 22 therebetween. Downstream pleats 30 are in oppositely-facing configuration from upstream pleats 20. Each downstream pleat 30 comprises a downstream pleat tip 31 and each adjacent pair of downstream pleats 30 defines a downstream pleat valley 32 therebetween. As used herein, the Pleat Direction ($D_p$ in FIG. 3, also referred to as the lateral direction) is a direction that is aligned with the long axis of the pleat tips (and that typically runs from one corrugated edge 4 to the other corrugated edge 4' of the pleated filter media). The longitudinal direction ($D_l$ in FIG. 3) is a direction that is orthogonal to the pleat direction and that typically runs from one noncorrugated edge 5 to the other noncorrugated edge 5' of the pleated filter media. (Although the terms longitudinal and lateral are used herein for convenience of description, it is not strictly necessary that the longitudinal dimension of pleated filter media 10 must be greater than the lateral (Pleat Direction) dimension of pleated filter media 10.) The upstream-downstream direction ($D_{u-d}$ in FIG. 3) is a direction extending through the filter element from the upstream side 2 to the downstream side 3, and typically corresponds to the overall direction of air flow through the filter element.

Figure 3:
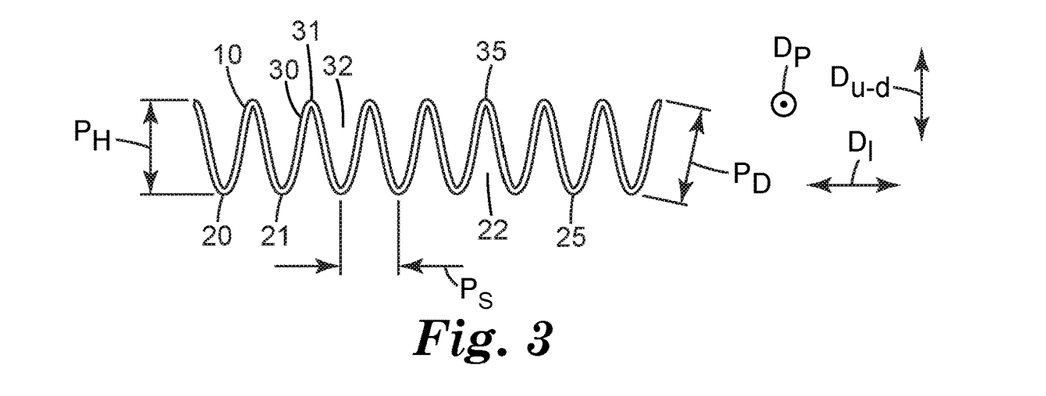
FIG. 3 is a side view of a portion of an exemplary pleated filter media of a pleated filter element.

Further details of pleat geometry are discussed with reference to the side view of FIG. 3 (in which a portion of an exemplary pleated air filter media 10 is viewed along the pleat direction $D_p$ with the later-described adhesive dams omitted for clarity). Pleat spacing, pleat height, and pleat distance as defined herein are evaluated with the pleated air filter media 10 in a nominally planar configuration in which the pleated filter media 10 exhibits a readily recognizable overall major plane (notwithstanding the local deviations from this plane that are inherent in each pleat), as in FIG. 3. The pleat height (pleat amplitude) is the distance ($P_h$ in FIG. 3) from a first-side pleat tip 21 to a second-side pleat tip 31, along a direction that is orthogonal to the overall major plane of filter media 10 (i.e., along a direction that is aligned with the upstream-downstream direction $D_{u-d}$ of the pleated media). In various embodiments, the pleat height of media 10 may be at least about 2, 4, 6, 8, 10, or 12 mm. In further embodiments, the pleat height may be at most about 45, 40, 35, 30, 25, 20, 15, 12, 10, 8, or 6 mm. In particular embodiments, a pleated media may exhibit a regularly varying pleat height, for example a predetermined alternating pattern of lower pleat heights interspersed with higher pleat heights.

The pleat spacing ($P_s$ in FIG. 3) is the distance between nearest-neighbor same-side pleat tips, along a direction that is aligned with the overall major plane of the filter media (i.e., along the longitudinal direction $D_l$ of the pleated media). Pleated filter media 10 may comprise any suitable pleat spacing. In various embodiments the pleat spacing may be at most about 20, 15, 10, 8, 6, 4, 3, or 2 mm; in further embodiments the pleat spacing may be at least about 1, 2, 3, 4, 5, 6, 8, or 10 mm. The pleat distance ($P_d$ in FIG. 3) is the shortest distance from one pleat tip to a nearest-neighbor pleat tip along the local direction of the pleated media (by way of specific example, if the first pleat tip is an upstream pleat tip its nearest-neighbor pleat tip for purposes of this measurement will be a downstream pleat tip). Pleated filter media 10 may comprise any suitable pleat distance (although, for any given pleated filter media, the pleat distance may be very close to, or somewhat larger than, the pleat height). In various embodiments, the pleat distance of media 10 can be at least about 2, 4, 6, 8 or 10 mm. In further embodiments, the pleat distance may be at most about 45, 40, 35, 30, 25, 20, 15, 12, 10, 8, or 6 mm.

In some embodiments the pleat tips of pleated media 10 may have an average radius of curvature that is less than about 3 mm. In various embodiments, such pleats may comprise tips with an average radius of curvature of at most about 2.5, 2.0, 1.5, 1.0, or 0.5 mm. In some embodiments media 10 may be tightly pleated, meaning that the pleat tips exhibit a very small radius of curvature and the pleat spacing is very small, both in comparison to the pleat height. In various embodiments, the pleated media 10 may exhibit a pleat tip radius of curvature that is less than about 2 mm, and/or a pleat spacing that is less than about 4 mm, and/or a pleat height that is from about 6 mm to about 16 mm. In further embodiments, the pleated media 10 may exhibit a pleat tip radius of curvature that is no greater than about 1 mm, a pleat spacing that is no greater than about 3 mm, and a pleat height that is from about 10 mm to about 14 mm.

Figure 4:
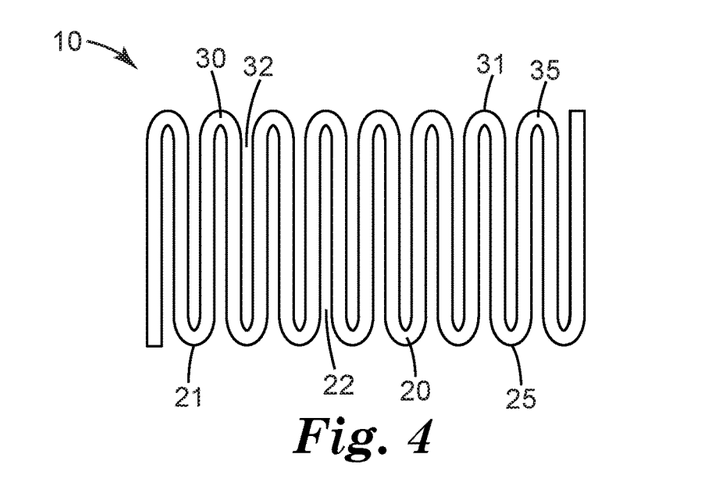
FIG. 4 is an isolated side view of a portion of another exemplary pleated filter media.

In embodiments in which media 10 is tightly pleated, adjacent walls of a pleat may be at least substantially parallel to each other over at least about 70, 80 or even 90% of the pleat height, on average. Such a tightly pleated media is shown in idealized representation in FIG. 4. In such a tightly pleated media, the maximum width of a pleat valley (e.g., valley 22 or valley 32), measured along the longitudinal direction Di of the media at a location approximately halfway between upstream and downstream pleat tips, may be less than 3.0, 2.0, 1.5, or even 1.0 mm. It has been found that the presence of dams of hardened adhesive as described herein can allow even a tightly pleated media to allow adequate air flow therethrough at a reasonably low pressure drop, as discussed below.

Filter media 10 can be pleated by any suitable method that can e.g. provide a tight pleat spacing. In some embodiments the media may be scored to provide score lines, along which the media can be folded to form very sharp pleat tips with a small radius of curvature, if desired. Such a pleating operation, which may be conveniently done e.g. by rotary-score pleating, may often result in score lines being readily apparent on at least one major surface (provided by e.g. a primary filtration layer or a prefilter layer) of filter media 10 of filter element 1. In some embodiments, both surfaces (upstream and downstream) of filter media 10 are rotary-scored so as to exhibit score lines (noting that any such score lines may or may not be visible on casual inspection of the pleated media and that it may be necessary to physically manipulate (e.g., partially unfold) the pleated media in order to see the score lines).

It will be appreciated that regardless of the inherent ability of materials to be scored and to be stiff enough to hold a pleat, relatively thin materials will be much more amenable to the achieving of a tight pleat spacing (particularly in combination with a relatively large pleat height). That is, even if a material is rotary score pleatable, such a material will not be physically capable of being formed into pleats with a pleat spacing of less than (for example) 3.0 mm, if the thickness of the material is greater than 1.5 mm. Thus in various embodiments, the total thickness of filter media 10 may be less than about 4.0, 3.0, 2.0, 1.5, 1.0, or 0.8 mm.

Edge Dams

As seen most easily in the perspective view of FIG. 1 and in the side view of FIG. 2, filter element 1 comprises a first adhesive edge dam 40, and a second adhesive edge dam 40'. Each adhesive edge dam is located proximate a corrugated edge (4 or 4') of the pleated filter media. Each dam is comprised of hardened adhesive. In many embodiments, the adhesive may be provided as a liquid that is applied as an elongate bead extending along the longitudinal direction of the media, proximate an edge of the filter media. Adhesive beads may be applied simultaneously to the upstream and downstream major surfaces of the media; or, adhesive beads may be applied to one major surface and then to the other major surface. After the adhesive beads are applied to both major surfaces, the media may then be compressed (with the adhesive still in an at least semi-liquid state) along the longitudinal direction of the media to a final pleated configuration (that exhibits the pleat spacing, pleat height, and so on, that is desired to be present when filter element 1 is used). This will cause the adhesive to at least generally fill each pleat valley at a location proximate a corrugated edge of the pleated filter media. The adhesive may then be hardened while the filter media is held in this pleated configuration.

The hardened adhesive thus forms a dam 40. In at least some embodiments, pleated filter media 10 comprises a first edge dam 40 at one corrugated edge 4 of the pleated filter media, and a second edge dam 40' at the other corrugated edge 4', as shown in exemplary embodiment in FIG. 1 (only a single edge dam 40 is visible in the side view of FIG. 2). It will be appreciated that the hardened adhesive portions in upstream pleat valleys 22, and the hardened adhesive portions in downstream pleat valleys 32, act in concert to provide dam 40, even though the adhesive portions in the upstream pleat valleys and those in the downstream pleat valleys are separated from each other by the thickness of the filter media and thus may never physically contact each other. That is, the hardened upstream and downstream adhesive portions collectively form dam 40.

Dams 40 and 40' (and optional interior dams as described later herein) can provide structural rigidity to the pleated air filter media, which can make the resulting filter element more mechanically robust, without e.g. having to use a casing material that might add undesirable weight and/or complexity. It is further noted that the presence of such adhesive dams can allow the achievement of a tight pleating pattern as discussed above (e.g. in which the pleat spacing is quite small and the walls of pleats are at least substantially parallel to each other). That is, if a very tight pleating pattern is used, the adhesive dams can act as spacers to provide that adjacent walls of pleats are not pushed completely against each other so that they are so closely spaced (e.g. touching each other) so as to disadvantageously block air flow through the pleat valleys.

First adhesive edge dam 40, and second adhesive edge dam 40' as pictured in exemplary embodiment in FIG. 2), are respectively located laterally inwardly proximate corrugated edges 4 and 4' of pleated filter media 10. By this is meant that each dam is located laterally about even with, or slightly laterally inward (i.e. no more than about 5 mm) from, the terminal end of the corrugated edge to which it is closest. To achieve this, each dam may be produced by depositing an adhesive bead onto a major surface of the media (along a line that may be located from even with the corrugated edge, to about 5 mm laterally inward from the corrugated edge) and then longitudinally compressing the media to the final pleat spacing, as described above. This will be contrasted with e.g. applying a liquid adhesive edgewise (so that it flows along the pleat direction of the pleated media) to the corrugated edge of the pleated filter media e.g. by dipping the corrugated edge of the pleated filter media in the liquid adhesive. In other words, in at least some embodiments a "laterally inwardly proximate" adhesive edge dam will not have any portion that extends laterally outward along the pleat direction of the pleated media beyond the terminal ends of the corrugated edges of the pleated media (except for such portions as may randomly occur occasionally, in any industrial process of this type). In various embodiments, each adhesive edge dam may be located at a position from about even with the terminal ends of a corrugated edge, to a position that is recessed laterally inward (measured from the centerline of the dam) from the terminal ends of the corrugated edges, no more than about 0.1 mm, 0.2 mm, 0.4 mm, 0.6 mm, 0.8 mm, 1.0 mm, 2.0 mm, 3.0 mm, or 4.0 mm. By way of specific example, exemplary adhesive edge dams 40 and 40' as shown in FIG. 1 may be located e.g. 1-2 mm laterally inward from the terminal ends of corrugated edges 4 and 4', and no portion of each adhesive edge dam extends outward beyond the terminal end of the corrugated edge to which it is proximate.

In some embodiments an edge dam of hardened adhesive may at least substantially or essentially fill the upstream and downstream pleat valleys so that it at least substantially occludes the pleat valleys so as to prevent airflow therethrough. In such a case an edge dam may serve as an edge seal that at least substantially or essentially prevents air (or any other flowing gas or gas mixture) from flowing laterally outward beyond a corrugated edge of the pleated filter media and thus at least partially bypassing the filter media. (The special case in which edge dams function as edge seals may be verified e.g. by mounting the filter element in a filter element housing as described later herein; if the performance of the filter element is substantially unaffected by any external sealing or gasketing that is applied to the filter element, this will indicate that the edge dams are performing as edge seals in the manner described herein.) It will be appreciated that the use of hardened adhesive edge dams 40 that serve as edge seals in this manner may e.g. eliminate the need to cover the corrugated edges of the pleated filter element with casing portions or gaskets, or to seal the corrugated edges of the pleated filter element by dipping the edges in a sealing material. Or, at the very least, the extent to which such measures may be needed, and may thus allow the complexity and cost of filter element 1 to be reduced.

If desired, one or more additional interior dams 42 can be provided laterally in between the first and second adhesive edge dams 40 and 40' as shown in exemplary embodiment in FIG. 1. Although not necessarily needed for any occluding function, such additional, interior adhesive dams may provide mechanical rigidity to the pleated filter element, and may also assist in maintaining the pleats of the filter media in e.g. a tightly pleated configuration (e.g. a configuration of the type shown in exemplary representation in FIG. 4). The adhesive dams may be spaced at least generally uniformly across the lateral extent of the pleated filter media (as in the exemplary embodiment of FIG. 1), if desired. Or, such spacing may vary as desired. Any number of interior dams (e.g. one, two, three, four, or more) may be present (two such interior dams are depicted in FIG. 1).

Each dam is provided collectively by upstream and downstream portions of hardened adhesive that respectively occupy upstream and downstream pleat valleys of the pleated filter media as noted above. Although in many embodiments it may be convenient to provide the upstream and downstream adhesive portions of a dam in a format in which they are aligned with each other along the Pleat Direction of the pleated media), in some embodiments the upstream and downstream adhesive portions may be offset from each other slightly along the pleat direction. Such offset is permissible as long as the upstream and downstream adhesive portions are sufficiently near each other along the Pleat Direction, to collectively act as a dam (e.g. to provide mechanical rigidity to the pleated filter element). In various embodiments, any such offset (measured from the centerline of each adhesive portion) will be less than about 5.0, 3.0, 2.0, 1.0, or 0.5 mm. In particular embodiments, the offset will be about 0 mm (i.e., essentially no offset will be present), as in the exemplary design of FIG. 1. The width of an adhesive dam (along the Pleat Direction of the media) may be any suitable value, for example, at least about 0.5, 1.0, 1.5, or 2.0 mm, or at most about 3.0, 2.5, 2.0, or 1.5 mm.

In some embodiments, at least portions of a dam may protrude outwardly (i.e. in the upstream-downstream direction) beyond pleat tips of the pleated media as shown in exemplary embodiment in FIG. 1. In some embodiments, a dam may protrude outward beyond the pleat tips a distance of e.g. at least about 0.2, 0.5 or 1.0 mm (measured at the outermost surface of the dam, as an average along the elongate length of the dam). In some embodiments, a dam may protrude less than 2.0, 1.5, 1.0, 0.5, or 0.2 mm outward beyond the pleat tips. In some embodiments, an outermost surface of a dam may be located within plus or minus 1.0, 0.5, or 0.2 mm of the pleat tips, again as an average along the elongate length of the dam. In some embodiments, any variation in the amount to which the edge dam protrudes (or is recessed) relative to the pleat tips, may be less than about 1.0, 0.5, or 0.2 mm, along the elongate length of the dam.

Edge dams 40 (and any interior dams 42 that may be present) are comprised of hardened adhesive. The term "adhesive" is used broadly to signify any material that can be deposited, e.g. as a bead, onto a major surface of pleated media 10 in a state (e.g., liquid, molten, softened, or semi-softened) in which it is sufficiently flowable or deformable that it can penetrate into pleat valleys (as the pleat valleys are formed during the pleating process) to satisfactorily (e.g., fully) occlude a corrugated edge as described above. Any suitable material may be used, including e.g. hot-melt adhesives, UV-cure adhesives, thermally-cured adhesives, moisture-cure adhesives, and so on. In some embodiments, the adhesive may be a hot-melt adhesive that is deposited through e.g. conventional hot-melt deposition methods (e.g. by use of a grid melter), after which the adhesive is cooled to harden. The adhesive is not required to necessarily exhibit any pressure-sensitive adhesive functionality after being hardened; in other words, the adhesive may be a non-tacky, e.g. hard material after being hardened. In at least some embodiments, the adhesive may be deposited as a bead that extends along the longitudinal direction of the pleated media, e.g. by passing the media underneath an adhesive-deposition nozzle or by moving the adhesive-deposition nozzle along the media.

In some embodiments the adhesive may be applied while the pleated media is held in a first, relatively open pleating pattern (that is, with a fairly large pleat spacing), with the pleated media then being compressed along its longitudinal axis to achieve the final (e.g. tighter) pleating pattern, after which the adhesive is then allowed to harden. In other embodiments, the media may not yet be pleated (but may have been scored to render it pleatable) when the adhesive is applied; in other words, the adhesive may be applied when the media is still in a flat, unpleated configuration.

The discussions above have focused on a pleated filter media 10 and pleated filter element 1 that are essentially flat (planar) in their overall shape (disregarding local deviations due to the pleating). However, in some embodiments the pleated filter media and pleated filter element may be arcuate (as shown in exemplary embodiment in the side view of FIG. 5). In specific embodiments, filter element 1 is planar as made, and is conformed into an arcuate shape in order to be installed into an arcuate receptacle of a filter element housing. It will be appreciated that in such embodiments the presence of edge dams 40 (and any interior dams that may be present) can provide mechanical strength and integrity to filter element 1 while not preventing element 1 from being conformed to the desired extent.

Although an arcuate filter element may not be upstream-downstream reversible, it may have other advantages in e.g. allowing a filter element housing into which the filter element is installed to be curved so as to follow the contours of a user's cheek or of a user's hip, and so on. In some embodiments, a convex side of arcuate filter element 1 is an upstream side 2, and a concave side of arcuate filter element 1 is a downstream side, as in the exemplary design of FIG. 5. In specific embodiments, an arcuate filter element is comprised of pleated filter media that is a multilayer laminate, with a prefilter layer (e.g. with a relatively high Percent Penetration) being disposed on the upstream (e.g. convex) side of the filter media and with a primary filtration layer (e.g. with a relatively low Percent Penetration) being disposed on the downstream (concave) side of the filter media.

An arcuate pleated filter media 10 and element 1 may be conveniently characterized by way of the average radius of curvature of the element and media. If a pleated filter media 10 is in a nominally planar configuration (e.g., as in FIGS. 1-4), the average radius of curvature will approach infinity. If pleated filter media 10 is arcuate, the average radius of curvature may be e.g. less than about 100 cm. In specific embodiments, the average radius of curvature $A_c$ may be less than about 80, 60, 50, 40, 30, 25, 20, 15, or 10 cm. In further embodiments, the average radius of curvature may be at least about 4, 6, 8, 10, 15, 20, or 25 cm. The radius of curvature is calculated as an average along the longitudinal length of the pleated filter media 10. The average is used in view of the fact that the radius of curvature may vary at least somewhat along the longitudinal length of the pleated filter media. In some embodiments the radius of curvature may be at least generally, substantially, or essentially constant along the length of the filter media. In other embodiments, the radius of curvature may vary.

Figure 5:
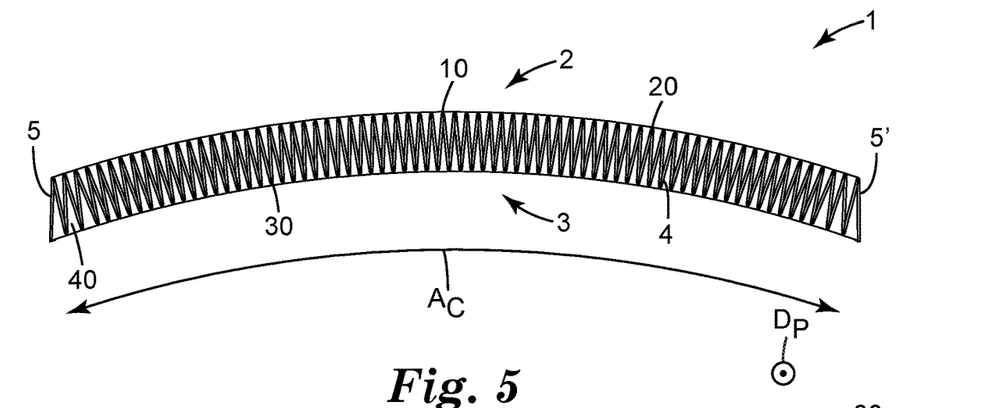
FIG. 5 is a side view of an exemplary pleated filter element, conformed into an arcuate shape.

In at least some embodiments an arcuate pleated filter media 10 will exhibit a shape with single curvature, with the curvature being along a conforming axis $A_c$ that is orthogonal to the pleat direction and is parallel to the longitudinal direction, as shown in FIG. 5. Such a configuration will be contrasted with a shape that exhibits compound curvature (such as e.g. a section of a sphere, paraboloid or hyperboloid). This can minimize the chance of any wrinkling or crumpling of the pleated media when it is curved into an arcuate configuration. It will be appreciated that such single-curvature embodiments will be distinguished from filters (e.g. in respirator mask bodies) that are formed into complex, compound-curvature shapes so as to conform to e.g. a human face.

In some embodiments filter element 1 may comprise a casing that is a separately-made component that is disposed on (e.g. fitted onto, wrapped around, etc.) at least portions of filter element 1. If such a casing is present, it will be provided as part of filter element 1, and will not be removable therefrom in ordinary use of filter element 1. Such a casing is thus not a part of e.g. a filter element housing of a respirator. Such a casing may be made of any suitable material, e.g. molded plastic, paperboard, or the like. Such casings are described in detail in U.S. Provisional Patent Application No. 62/186,566, entitled FILTER CARTRIDGE COMPRISING FILTER MEDIA WITH ADHESIVELY EDGE-SEALED ENDS, AND METHOD OF MAKING AND USING, which is incorporated by reference herein in its entirety. In other embodiments, filter element 1 does not comprise any such casing.

Uses of Filter Element

Filter element 1 may be used in any application in which it is desired to filter air (which term generally encompasses any breathable gaseous mixture). In various embodiments, filter element 1 can be used in heating-ventilation-air-condition (HVAC) systems (whether centralized systems or so-called mini-split systems), room air purifiers, cabin air filters for vehicles, filters for internal combustion engines, and so on.

Figure 6:
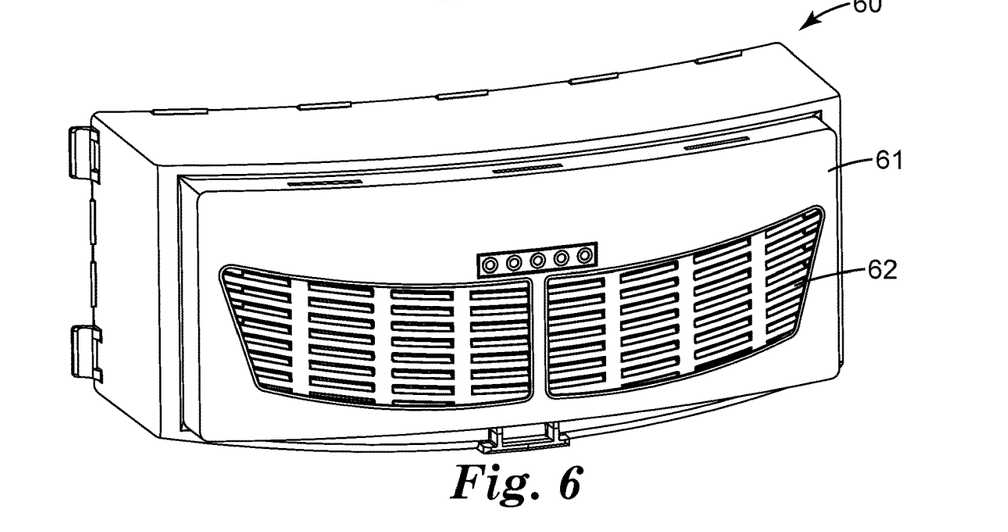
FIG. 6 is a perspective upstream view of an exemplary filter element housing.
Figure 7:
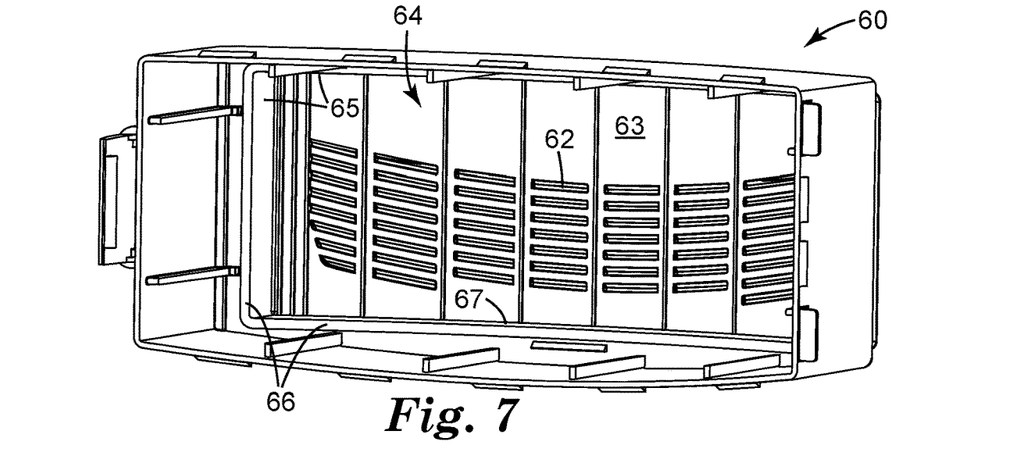
FIG. 7 is a perspective downstream view of an exemplary filter element housing.

In particular embodiments, filter element 1 may be used in any suitable respirator that is configured to filter breathing air. In order to include filter element 1 in a respirator, it may be convenient to install filter element 1 into the interior of a filter element housing 60 as shown in exemplary embodiment in FIGS. 6 and 7. Filter element 1 and filter element housing 60 may be used with any type of respirator, e.g. powered or unpowered, full-mask or half-mask, and so on. In various embodiments, such a respirator may comprise at least a mask body that comprises a portion that covers at least the nose and mouth of a user (and may take the form of e.g. a helmet) to define an interior air space. An exhalation valve may be provided to allow exhaled air to be discharged from the interior air space. Such a respirator may also include a harness assembly that is able to support the mask body on a user's head. In some embodiments, filter element housing 60 may be mounted in close proximity to the mask body. For example, a single filter element housing may be fluidically connected to the mask body, e.g. at a location in front of the mouth and/or nose of the user. Or, dual filter element housings may be mounted e.g. at locations adjacent the right and left cheek of the user. In other embodiments, one or more filter element housings may be located in a unit that is remote from the mask body, e.g. a powered unit that is located e.g. on a hip belt and that comprises a fan that motivates the filtered air through a supply tube to the mask body. Filter element housing 60 as depicted in FIGS. 6 and 7 may be particularly suitable e.g. for mounting on a hip belt as part of a so-called powered-air-purifying-respirator (e.g., such as the product available from 3M Company under the trade designation VERSA-FLO TR-600) that e.g. delivers filtered air by way of a hose that fluidically connects filter element housing 60 with a mask body or helmet that resides on a user's face or head. However, it is emphasized that filter element 1 may be installed in a filter element housing of any suitable type.

Filter element housing 60 comprises at least one major housing portion that is configured to receive at least one filter element 1 and to fluidically connect the filter element to other components of a respirator (e.g. to a mask body). Housing 60 (e.g., major housing portion thereof) may comprise an upstream major face 61 that comprises an air-permeable area 62 (which may conveniently be achieved by providing numerous through-perforations in area 62 of upstream face 61 of filter element housing 60, as shown in FIG. 6). In particular embodiments, housing 60 (e.g. at least a major housing portion thereof) may be made of an organic polymeric resin that is molded (e.g. injection molded, vacuum-formed, thermoformed, etc.) into a desired shape. (Other ancillary parts, e.g. latches, fittings, and so on, may be attached to housing 60 as desired.)

In some embodiments, filter element 1 may be disposable with filter element housing 60 being reusable. In such embodiments, filter element housing 60 is not a part of filter element 1 itself and in particular is not non-removably attached to filter element 1. In such cases, housing 60 may comprise a closing portion (not shown in FIG. 6 or 7) that is e.g. air-impermeable and that may, when closed, serve to securely hold filter element 1 in place within the interior 63 of filter element housing 60. Such a closing portion may be e g hingedly connected or snap-fittable to housing 60, so that the closing portion can be opened or temporarily removed so that a filter element 1 can be removed and a replacement filter element 1 installed.

In other embodiments, filter element 1 and a filter element housing 60 may be provided to a user as a unit, e.g. with filter element 1 non-removably attached to housing 60. Housing 60 containing filter element 1 will be removably attachable to other components of a respirator so as to establish a fluidic connection between housing 60 and a mask body of the respirator, so that filtered air can be delivered to the mask body. In such embodiments, housing 60 containing filter element 1 therein may be removed and discarded or recycled, and a new housing and filter element installed in the respirator, at a desired time.

In the illustrative embodiment of FIG. 7, interior 63 of housing 60 includes a receptacle 64 that is configured to receive filter element 1. (In the particular embodiment of FIG. 7, receptacle 64 is arcuately shaped so as to receive an arcuate filter element.) Receptacle 64 may comprise sidewalls 65 that abut noncorrugated edges 5 and 5', and sidewalls 67 that abut corrugated edges 4 and 4', of pleated filter element 1 when installed within receptacle 64. In some embodiments the longitudinal distance between sidewalls 65 may be set so that filter element 1 is slightly longitudinally compressed (accordionized) in order to fit within the space between longitudinal sidewalls 65. Such an arrangement may help hold filter element 1 securely in place, while not compressing the pleats of filter element 1 together to such an extent as to disadvantageously affect the filtration performance. In various embodiments, a longitudinal distance between longitudinal sidewalls 65 may be at most about 100, 98, 96, or 94% of the longitudinal length (before being compressed for installation into receptacle 64) of filter element 1.

If desired, a sealant or potting material (e.g. a hardenable material such as an RTV silicone or the like) may be disposed as a bead along corrugated edges 4 and 4', and/or along noncorrugated edges 5 and 5', e.g. at locations at which these edges are abutted against surfaces 66 of sidewalls 67 and/or 65 of housing 60, as seen in FIG. 7. Such a material, after hardening, may minimize any air leaks around the edges of filter element 1. It will be appreciated that the presence of edge dams, in particular edge seals, within filter element 1 as discussed herein, may reduce or even eliminate the need for such a material to be used along sidewalls 67 for purposes of minimizing air leakage around corrugated edges 4 and 4' of filter element 1. Such a material may of course be used to seal the noncorrugated edges 5 and 5' of the pleated filter element, against sidewalls 65 of the housing, if desired. Moreover, even if no such material is needed for sealing, such a material may be applied to bond at least some portions of the edges of filter element 1 to surfaces of receptacle 64 if desired e.g. in order to more securely hold filter element 1 in place within housing 60.

In some embodiments, one or more gaskets (not shown in any Figure) may be provided within interior 64 of filter element housing 60 to assist in securely installing filter element 1 therein. Such a gasket may be permanently attached to housing 60; or, it may be removable and replaceable if desired. Such a gasket may be made of a resilient polymeric material such as rubber, silicone, or the like. The polymeric material may be solid, or may be a foam. If a foam, it may be an open-cell foam, or a closed cell foam. In some embodiments, no such gasket is present.

In some embodiments, filter element 1 may be the only filtering component that resides within filter element housing 60. However, in other embodiments, one or more layers of material may reside within housing 60 (e.g., in overlapping relation to, e.g. butted up against a major surface of, filter element 1) for some additional purpose. Such a layer or layers may contain one or more materials that interact with an airstream to at least partially remove one or more components (e.g., gases, vapors, solid particles, aerosols, and so on) therefrom. The components in the fluid may be e.g. sorbed onto or into an active sorbent, may be reacted with a reactive ingredient, may be exposed to a catalyst, and so on. Potentially suitable materials for such uses include e.g., activated carbon; alumina and other metal oxides; sodium bicarbonate; metal particles (e.g., silver particles) that can remove a component from a fluid by adsorption, chemical reaction, or amalgamation; catalytic agents such as hopcalite and/or gold (which can catalyze the oxidation of carbon monoxide); clay and other minerals treated with acidic solutions such as acetic acid or alkaline solutions such as aqueous sodium hydroxide; ion exchange resins; molecular sieves and other zeolites; silica; biocides; fungicides and virucides. Mixtures of any such materials can be employed. In other embodiments, such materials may be provided as particles in a particle-loaded web layer. Combinations of any of these approaches may be used. If desired, such materials may be treated e.g. with one or more impregnants to enhance gas removal capability. Examples of treated materials include chemically surface-treated activated carbon.

In many embodiments, flowing air will locally approach filter element 1, and will locally leave filter element 1, along a direction that is at least generally aligned with the upstream-downstream direction $D_{u\text{-}d}$ of the filter element. Such a direction will often be at least generally orthogonal to the pleat direction $D_p$ of the pleated filter media 10. That is, in ordinary use of a pleated filter element 1, there may often be little or no airflow along the long axis of the valleys of the pleated media. In particular, pleated filter element 1 is distinguished from arrangements in which a fluid flows along the valleys in between multiple layers (e.g., stacks or wraps) of pleated media. Pleated filter element 1 is thus distinguished from e.g. so-called spiral-wound filters and the like that, as supplied, comprise multiple layers of filter media and in which substantial fluid flow may occur along the long axis of the valleys in between layers of the pleated media. Thus in at least some embodiments, filter element 1 will include only a single layer of pleated media 10 (although pleated media 10 itself may be a multilayer material) rather than including a stack or wrap of multiple layers of media. In particular embodiments, filter element 1 is not a cylindrical cartridge filter.

LIST OF EXEMPLARY EMBODIMENTS

Embodiment 1 is a pleated filter element comprising: a pleated filter media comprising a major upstream face and an major downstream face and comprising a plurality of oppositely-facing pleats with a pleat direction and with a plurality of upstream pleat tips and upstream valleys and a plurality of downstream pleat tips and downstream pleat valleys; wherein the pleated filter media comprises a first corrugated edge and a second corrugated edge; and, a first noncorrugated edge and a second noncorrugated edge; wherein the first corrugated edge of the pleated filter media comprises a first edge dam of hardened adhesive that occupies the upstream pleat valleys and the downstream pleat valleys of the pleated filter media at a location laterally inwardly proximate the first corrugated edge of the pleated filter media and that extends along an entire longitudinal extent of the pleated filter media, and wherein the second corrugated edge of the pleated filter media comprises a second edge dam of hardened adhesive that occupies the first-side pleat valleys and the second-side pleat valleys of the pleated filter media at a location laterally inwardly proximate the second corrugated edge of the pleated filter media and that extends along the entire longitudinal extent of the pleated filter media; and, wherein the pleated filter media is a multilayer filter media comprising a primary filtration layer laminated together with an additional layer, wherein the primary filtration layer comprises an organic polymeric nonwoven web that exhibits a Percent Penetration of less than 5 and wherein the additional layer is a fiberglass prefilter layer that is disposed upstream of the primary filtration layer and that exhibits a Percent Penetration of greater than about 70.

Embodiment 2 is the pleated filter element of embodiment 1 wherein the primary filtration layer comprises a blown microfiber nonwoven web or a spunbond nonwoven web, which nonwoven web comprises at least some electret fibers that comprise charged electret moieties. Embodiment 3 is the pleated filter element of any of embodiments 1-2 wherein the primary filtration layer exhibits a Percent Penetration of less than 1.0 and wherein the fiberglass prefilter layer exhibits a Percent Penetration of greater than about 90. Embodiment 4 is the pleated filter element of any of embodiments 1-3 wherein a ratio of a Gurley Stiffness of the additional layer to a Gurley Stiffness of the primary filtration layer, is at least about 2.5.

Embodiment 5 is the pleated filter element of any of embodiments 1-4 wherein the fiberglass prefilter layer comprises a thickness of less than about 0.6 mm and a pressure drop of less than about 3.0 mm of water. Embodiment 6 is the pleated filter element of any of embodiments 1-5 wherein the primary filtration layer comprises a thickness of less than about 0.8 mm and a pressure drop of from about 6.0 to about 14.0 mm of water. Embodiment 7 is the pleated filter element of any of embodiments 1-6 wherein the primary filtration layer is adhesively laminated to the fiberglass prefilter layer.

Embodiment 8 is the pleated filter element of any of embodiments 1-7 wherein the pleated filter media exhibits a pleat spacing of less than about three millimeters. Embodiment 9 is the pleated filter element of any of embodiments 1-8 wherein the pleated filter media exhibits a pleat height of from about five millimeters to about thirty millimeters. Embodiment 10 is the pleated filter element of any of embodiments 1-9 wherein the filter media is pleated so that adjacent walls of pleats are at least substantially parallel to each other over at least about 70% of the pleat height, on average. Embodiment 11 is the pleated filter element of any of embodiments 1-10 wherein the pleated filter media is a rotary-score pleated media that comprises a plurality of score lines on at least one of a major upstream face of the pleated filter media and a major downstream face of the pleated filter media.

Embodiment 12 is the pleated filter element of any of embodiments 1-11 wherein the first edge dam is a first edge seal that is configured so that the first corrugated edge of the pleated filter media is occluded by the first edge seal, and wherein the second edge dam is a second edge seal that is configured so that the second corrugated edge of the pleated filter media is occluded by the second edge seal. Embodiment 13 is the pleated filter element of any of embodiments 1-12 wherein the first edge dam comprises a lateral offset of less than about 3 mm, and wherein the second edge dam comprises a lateral offset of less than about 3 mm. Embodiment 14 is the pleated filter element of any of embodiments 1-13 comprising at least one additional dam of hardened adhesive that is an interior dam located laterally between the first edge dam of hardened adhesive and the second edge dam of hardened adhesive and that extends along the entire longitudinal extent of the pleated filter media.

Embodiment 15 is the pleated filter element of any of embodiments 1-14 wherein the pleated filter element consists essentially of an organic polymeric nonwoven primary filtration layer that is laminated to a fiberglass prefilter layer, first and second edge dams of hardened adhesive, and one or more optional interior dams of hardened adhesive. Embodiment 16 is the pleated filter element of any of embodiments 1-15 wherein the pleated filter element is conformed into an arcuate shape along a conforming axis that is at least substantially perpendicular to the pleat direction. Embodiment 17 is the pleated filter element of embodiment 16 wherein the upstream face of the pleated filter media is on a convex side of the pleated filter element and the downstream face of the pleated filter media is on a concave side of the pleated filter element.

Embodiment 18 is a filter element housing comprising a filter element of any of embodiments 1-17 installed in an interior thereof, the filter element housing comprising a major housing portion that exhibits at least one major surface with an air-permeable area, and that comprises an interior with a receptacle configured to receive the filter element. Embodiment 19 is the filter element housing of embodiment 18 wherein the receptacle of the filter element housing is an arcuate receptacle that is configured to accept a filter element that exhibits an arcuate shape. Embodiment 20 is the filter element housing of any of embodiments 18-19 wherein at least one additional layer of filtration material that is not a part of the filter element, is installed within the interior of the filter element housing.

Embodiment 21 is a respirator comprising a mask body with a filter element housing fluidly connected thereto, the filter element housing comprising a filter element of any of embodiments 1-17 installed therein. Embodiment 22 is the respirator of embodiment 21 wherein the respirator is a half-mask respirator, a full-mask respirator, or a powered-air respirator. Embodiment 23 is the respirator of embodiment 21 wherein the respirator comprises a mask body and a remote unit that comprises the filter element housing comprising the filter element installed therein, the remote unit being a powered unit comprising a fan and comprising a supply tube that fluidically connects the remote unit to the mask body, whereby filtered air can be delivered from the remote unit to the mask body.

Embodiment 24 is a method of making a pleated filter element of any of embodiments 1-17, the method comprising: laminating a primary filtration layer to a prefilter layer to form a laminate with an upstream major face and a downstream major face, the prefilter layer providing the upstream major face of the laminate; rotary-scoring the laminate to provide a plurality of score lines; with the laminate in a flat configuration, applying an upstream portion of a first edge bead of adhesive, and a downstream portion of the first edge bead of adhesive, to a longitudinally-extending length of the laminate; and, applying an upstream portion of a second edge bead of adhesive, and a downstream portion of the second edge bead of adhesive, to the longitudinally-extending length of the laminate, wherein the first edge bead is laterally inwardly proximate a first lateral edge of the laminate and wherein the second edge bead is laterally inwardly proximate a second lateral edge of the laminate; compressing the pleated laminate along a longitudinal axis of the laminate so that the laminate folds along the score lines to becomes a pleated laminate; and, allowing the first and second edge beads of adhesive to harden to form first and second edge dams of hardened adhesive, to form a pleated filter element.

Embodiment 25 is the method of embodiment 24, further comprising the step of conforming the pleated filter element into an arcuate shape, along a conforming axis that is at least substantially perpendicular to a pleat direction of the pleated filter element. Embodiment 26 is the method of embodiment 25 further comprising the step of installing the pleated filter element in an arcuate shape, into an arcuate receptacle within an interior of a filter element housing.

EXAMPLES

Test Procedures

Effective Fiber Diameter

The Effective Fiber Diameter (EFD) of a web is evaluated according to the method set forth in Davies, C. N., 'The Separation of Airborne Dust and Particles,' Institution of Mechanical Engineers, London, Proceedings 1B, 1952. Unless otherwise noted, the test is run at a face velocity of 14 cm/sec.

Gurley Stiffness

Gurley Stiffness is measured using a Gurley Stiffness Tester Model 4171E (Digital), available from Gurley Precision Instruments, Troy, N.Y. The Stiffness is measured according to the procedures provided in the operating manual for the Tester. The Tester is calibrated with a standard brass shim prior to sample testing. For each material, three separate individual physical samples are tested. Each sample is a flat-web (unpleated) sample, cut (e.g. from roll) to a total length of 3.5 inches, corresponding to a test dimension of 3 inch length (with 0.25 inches of the sample being held in the upper clamp of the Tester and with 0.25 inches of the sample extending below the lower pendulum of the Tester). Sample width is 1 inch. If the sample exhibits an identifiable machine direction (downweb direction), the sample is cut so that the long (test) dimension is aligned with the machine direction of the sample. Samples comprising organic polymeric webs (e.g. nonwoven webs) are treated with a static discharge gun prior to testing. Each individual physical sample is tested two times, cycling back and forth from the left and right side of the sample. Results are averaged and are reported in milligrams of force (Gurley Units).

% Penetration, Pressure Drop, and Quality Factor

Percent Penetration, pressure drop, filtration Quality Factor (QF), and related parameters of a filtration media sample are obtained using a challenge aerosol containing either DOP (dioctyl phthalate) liquid droplets or NaCl (sodium chloride) solid particulates, in generally similar manner as disclosed in PCT International Publication No. WO 2015/199972 and in U.S. Provisional Patent Application No. 62/015,637, both of which are incorporated by reference herein. An Automated Filter Tester AFT Model 8130 (TSI, Inc., St. Paul Minn.) may be used, with a challenge aerosol that comprises DOP droplets or NaCl particulates, with a mass median diameter in the range of approximately 0.3 μm (e.g., a mass median diameter of approximately 0.26 for DOP, and a mass median diameter of approximately 0.33 for NaCl). In the following Examples, the challenge aerosol was delivered at a flow rate of 85 liters/min (LPM) to provide a face velocity of 14 cm/s, unless otherwise indicated. Testing was performed on flat webs except as noted.

The particle concentration is measured at the sample inlet and outlet and the Percent Penetration of particles through the filtration web is thus obtained, and the pressure drop through the filtration web is monitored by way of transducers e.g. of the general type available from MKS Instruments (Andover, Mass.). The equation:

$$QF = \frac{-\ln\left(\frac{\% \text{ Particle Penetration}}{100}\right)}{\Delta P}$$

is used to calculate Quality Factor (QF).

Parameters which may be measured or calculated from such test procedures include initial Percent Penetration, initial pressure drop, and initial Quality Factor QF. Initial parameters are obtained upon initially exposing the filter media sample to the challenge aerosol, as will be well understood by the ordinary artisan. All Percent Penetration and pressure drop numerical values, ranges, etc. that are present in this document (including both the specification and the claims), will be understood to be initial parameters, using DOP, unless otherwise specified. All such numerical values will be understood to be at a face velocity of 14 cm/s (i.e. for primary filtration layers and for laminates), except for the specific case of fiberglass layers, which will be understood to be at a face velocity of 5.3 cm/s, which is a customary test condition for such materials.

Loading tests may be performed by continuously challenging the filter with aerosol over a period of time while monitoring penetration and pressure drop; the test may be stopped after a particular loading of particles is reached or after a clear maximum in the penetration is observed and the final Percent Penetration, final pressure drop, and/or final quality factor at the conclusion of the loading test may be recorded. All particle penetration results are reported as Percent Penetration (e.g. a reported value of 80 means 80%; a reported value of 0.1 means 0.1%). Filtration efficiency (e.g., initial or final) may also be obtained, which is 100 minus the Particle Penetration and is likewise reported in percent.

Representative Working Example

Materials

A blown microfiber (BMF) nonwoven web was obtained that was comprised of polypropylene that comprised charged electret moieties. The web was listed as comprising a nominal basis weight of approximately 40 gm/m$^2$; the actual sample tested exhibited a measured basis weight of approximately 30 gm/m$^2$. The web exhibited a thickness of approximately 0.3 mm, an effective fiber diameter of approximately 4.6 gm, a Gurley stiffness of approximately 23 mg, a DOP Percent Penetration (initial) of approximately 0.45, a pressure drop (initial) of approximately 9.8 mm of H$_2$O, and a Quality Factor (initial) of approximately 0.55 l/mm H$_2$O.

A fiberglass web was obtained from Hollingsworth and Vose (under the trade designation HF-0121), and was comprised of a glass fibers bonded to each other with an acrylic resin binder. The fiberglass web exhibited a basis weight of approximately 49 gm/m$^2$, a thickness of approximately 0.41 mm, an effective fiber diameter of approximately 11.9 μm, and a Gurley stiffness of approximately 250 mg. The fiberglass web exhibited a DOP Percent Penetration (initial) of approximately 94, a pressure drop (initial) of approximately 0.2 mm of H$_2$O, and a Quality Factor (initial) of approximately 0.26 l/mm H$_2$O (all measured at a flowrate of 32 liters per minute/5.3 cm/s face velocity).

Laminated Samples

The nonwoven BMF web and the fiberglass web were obtained in roll form and were laminated together using conventional web-handling and lamination equipment running at a line speed of approximately 100 feet per minute. A hot melt adhesive (obtained from Bostik under the trade designation HM9041) was applied to the surface of the nonwoven BMF web (by spraying) at a nominal loading of 5 grams/m$^2$, at a temperature estimated to be in the range of 370° F. The nonwoven BMF web and the fiberglass web were brought into contact with each other and the adhesive was allowed to cool, thus bonding the two layers to each other to form a laminate. In the laminate, the "air" side of the BMF web (i.e., the side opposite from the side that contacted the collecting surface in the meltblowing process) faced the "dense" side (as ascertained from visual inspection) of the fiberglass web.

Testing of Flat Web Laminate Samples

The laminate (tested with the fiberglass web facing the incoming airstream so as to function as a prefilter layer) exhibited a DOP Percent Penetration (initial) of approximately 0.03(%), a pressure drop (initial) of approximately 13.1 mm of $H_2O$, and a Quality Factor (initial) of approximately 0.63 1/mm $H_2O$. The laminate thus exhibited a significantly improved initial Percent Penetration and Quality Factor in comparison to that of the primary filtration layer (the nonwoven BMF web) used alone, while exhibiting only a mildly higher flow resistance (pressure drop). Similar results were obtained with challenge aerosols comprising NaCl rather than DOP.

Loading tests were also performed using NaCl as a challenge aerosol. It was observed that laminate samples exhibited a significantly smaller increase in flow resistance as the filter media became loaded with particles, in comparison to the nonwoven BMF web used alone. For example, a laminate sample exhibited an initial pressure drop of approximately 13 mm $H_2O$, which increased to a final pressure drop of approximately 150 mm $H_2O$ at an NaCl loading of approximately 150 mg. In comparison, a sample of the nonwoven BMF web exhibited an initial pressure drop of approximately 10 mm $H_2O$, which increased to a final pressure drop of approximately 150 mm $H_2O$, at an NaCl loading of only approximately 60 mg.

The laminate exhibited a Gurley stiffness of approximately 490 mg.

Pleated Samples

Rolls of the laminate (that had been slit to approximately 3 inches (7.5 cm) in lateral width) were scored across the width of the laminate using a high-speed rotary scoring apparatus (operating at a speed that was believed to impart between 500 and 600 scores per minute). Both sides of the laminate were scored to provide score lines. The score lines were spaced along the longitudinal (downweb) length of the laminate to provide a final configuration (after the laminate was compressed into a pleated configuration) of approximately 12 pleats per inch (corresponding to a pleat spacing of approximately 2.1 mm), at a pleat height of approximately 13 mm.

The scored laminate, while still in a flat configuration, had four beads of liquid hot-melt adhesive (obtained from Truxes Company under the trade designation PF-3165) applied to the major surface of the fiberglass prefilter layer (which surface would eventually provide the upstream face of the pleated laminate). The four upstream beads were applied (by nozzles of a grid melter as the flat laminate was moved past the grid melter) as elongate stripes that were spaced across the width of the laminate and extended along the longitudinal length of the laminate. Of these four beads, first and second were edge beads that were applied at locations no more than approximately 2-3 mm laterally inward from first and second lateral edges of the laminate. The third and fourth beads were interior beads that were spaced generally similarly equally across the width of the laminate between the two edge beads (the lateral spacing between each pair of beads was thus in the range of approximately 22-28 mm). Similar beads were simultaneously applied to the (opposing) major surface of the nonwoven web (which surface would eventually provide the downstream face of the pleated laminate). Each downstream beads was aligned with its corresponding upstream bead, within a lateral distance of approximately 2 mm or less.

While the adhesive beads were still in liquid form, the scored laminate was compressed (during which process the media folded along the score lines) to its final pleated configuration of a pleat spacing of approximately 2.2 mm and a pleat height of approximately 13 mm. During this process, the liquid adhesive penetrated into the pleat valleys as the pleats were formed, and at least substantially filled the pleat valleys and, at the pleat tips, protruded outward beyond the pleat tips a distance estimated to be (on average) approximately 0.5-1 mm. During this process the adhesive was still sufficiently tacky at the surfaces of the beads so that two portions of an adhesive bead, if meeting in a pleat valley during the folding operation, could adequately bond to each other. The adhesive was allowed to harden so that each pair of aligned upstream and downstream beads collectively formed a dam of hardened adhesive.

The pleated media bearing hardened adhesive dams was then cut into lengths of approximately 8 inches (20.3 cm) to form pleated filter elements (each comprising approximately 92 pleats). A pleated filter element was installed into a filter element housing of the type shown in FIGS. 6 and 7 (and of the general type available from 3M Company under the trade designation VERSAFLO TR-600). Since the filter element housing comprised an arcuate receptacle for receiving an arcuate filter element, the pleated filter element was conformed (along a conforming axis that was essentially parallel to the longitudinal axis of the pleated filter element) into an arcuate shape with a radius of curvature estimated to be in the range of approximately 30 cm. The pleated filter element was slightly oversized in length (e.g. in the range of 2-3 mm) in comparison to the receptacle, so that the non-corrugated ends of the filter element were held in the receptacle under slight compression. A bead of glue (moisture-curable polyurethane adhesive, obtained from 3M Company under the trade designation SCOTCH-WELD TE040) was applied to the downstream perimeter of the filter element (overlapping onto the adjacent surfaces of the housing) to hold the filter element securely in place. It was noted that in at least some samples the edge beads appeared to at least substantially occlude the corrugated edges of the pleated filter media, so it was believed that satisfactory filtration performance could be achieved with a downstream glue bead only serving to secure the filter element in place (and to seal the noncorrugated edges of the filter element against the abutting walls of the receptacle of the housing) rather than such a downstream glue bead being necessary to seal the corrugated edges of the filter element against air leaks.

The pleated filter elements, as installed into housings as described above, were evaluated for their performance. Multiple samples were tested, and exhibited an average DOP Percent Penetration of 0.0038, and an average pressure drop of 15.3 mm of $H_2O$ (flow rate 85 LPM, face velocity unknown). Samples were also evaluated in a silica dust loading test (of the general type described in U.S. Pat. No. 4,462,399) and exhibited good performance (e.g. the samples met or exceeded the desired flow requirements at a silica dust loading exposure of up to four hours).

Variation Working Examples

Other samples were made in similar manner as described above, except using fiberglass prefilter media (obtained from Hollingsworth and Vose under the trade designation HF-11732A), that exhibited a basis weight of approximately 75 gm/m², a thickness of approximately 0.73 mm, an effective fiber diameter of approximately 6.9 μm, and a Gurley stiffness of approximately 220 mg. This prefilter media exhibited a DOP Percent Penetration (initial) of approximately 81, a pressure drop (initial) of approximately 1.0 mm of H₂O, and a Quality Factor (initial) of approximately 0.22 l/mm H₂O (all measured at a flowrate of 32 liters per minute, face velocity 5.3 cm/s). Laminates made from this prefilter media (using the same nonwoven BMF primary filtration layer described above, and tested as flat samples) exhibited a DOP Percent Penetration (initial) of approximately 0.01, a pressure drop (initial) of approximately 16.0 mm of H₂O, and a Quality Factor (initial) of approximately 0.56 l/mm H₂O. These samples also exhibited good performance in loading tests, in similar manner to that described above for the Representative Working Example. Laminates made from this prefilter media were rotary-score pleated in similar manner as described above and were found to be easily pleatable by such methods, in like manner to the Representative Working Example.

Laminates were also made from two other fiberglass prefilter media (obtained from Hollingsworth and Vose under the trade designation HF-13732A and HE-14732A) in combination with the above nonwoven BMF web. These fiberglass media respectively exhibited DOP Percent Penetrations of approximately 41 and 32 (at 32 L/min, 5.3 cm/s) and Gurley Stiffnesses of approximately 810 and 600 mg. Laminates made from these prefilter media were easily rotary-score pleatable and exhibited excellent filtration performance (e.g. according to Percent Penetration). However, they did not exhibit the superior performance in loading tests that were found with laminates made from the other (higher Percent Penetration) fiberglass media.

Laminates were also made with other primary filtration media (e.g. a nonwoven BMF web comprising charged electret moieties, but comprising a lower basis weight (approximately 25 grams/m²) in comparison to the nonwoven web of the Representative Working Example), in combination with fiberglass prefilter layers. These laminates were likewise easily pleatable and exhibited excellent filtration performance.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document mentioned and/or incorporated by reference herein, this specification as written will control.

What is claimed is:

1. A pleated filter element comprising:
   a pleated filter media comprising a major upstream face and a major downstream face and comprising a plurality of oppositely-facing pleats with a pleat direction and with a plurality of upstream pleat tips and upstream pleat valleys and a plurality of downstream pleat tips and downstream pleat valleys;
   wherein the pleated filter media comprises a first corrugated edge and a second corrugated edge; and, a first noncorrugated edge and a second noncorrugated edge;
   wherein the first corrugated edge of the pleated filter media comprises a first edge dam of hardened adhesive that occupies the upstream pleat valleys and the downstream pleat valleys of the pleated filter media at a location laterally inwardly proximate the first corrugated edge of the pleated filter media and that extends along an entire longitudinal extent of the pleated filter media, and wherein the second corrugated edge of the pleated filter media comprises a second edge dam of hardened adhesive that occupies the upstream pleat valleys and the downstream pleat valleys of the pleated filter media at a location laterally inwardly proximate the second corrugated edge of the pleated filter media and that extends along the entire longitudinal extent of the pleated filter media;
   wherein the pleated filter media is a multilayer filter media comprising a primary filtration layer laminated together with an additional layer, wherein the primary filtration layer comprises an organic polymeric nonwoven web that exhibits a Percent Penetration of less than 5 and wherein the additional layer is a prefilter layer that is disposed upstream of the primary filtration layer and that exhibits a Percent Penetration of greater than 70,
   wherein the first edge dam is a first edge seal that is configured so that the first corrugated edge of the pleated filter media is occluded by the first edge seal, and wherein the second edge dam is a second edge seal that is configured so that the second corrugated edge of the pleated filter media is occluded by the second edge seal,
   wherein the first and second edge seals are obtained by applying a liquid adhesive to an upstream major surface of a filter media in the form of a first elongate bead that extends along a longitudinal direction of a filter media at a location laterally inward from a first edge of the filter media and by applying the liquid adhesive to a downstream major surface of a filter media in the form of a second elongate bead that extends along the longitudinal direction of the filter media at a location laterally inward from a second edge of the filter media, then compressing the filter media along the longitudinal direction of the filter media to form the pleated filter media, and hardening the first and second elongate beads of liquid adhesive to form the first and second edge seals, so that the first edge seal is located from laterally inward from the first corrugated edge of the pleated filter media with no part of the first edge seal extending laterally outward beyond the first corrugated edge of the pleated filter media, and so that the second edge seal is located laterally inward from the second corrugated edge of the pleated filter media with no part of the second edge seal extending laterally outward beyond the second corrugated edge of the pleated filter media.

and wherein the filter media is tightly pleated so that the filter media exhibits a pleat spacing of less than three millimeters and so that adjacent walls of pleats are at least substantially parallel to each other over at least 70% of the pleat height, on average, and wherein the edge dams maintain the tightly pleated filter media in the tightly pleated configuration.

2. The pleated filter element of claim 1 wherein the primary filtration layer comprises a blown microfiber nonwoven web or a spunbond nonwoven web, which nonwoven web comprises at least some electret fibers that comprise charged electret moieties.

3. The pleated filter element of claim 2 wherein the primary filtration layer exhibits a Percent Penetration of less than 1.0 and wherein the prefilter layer is a fiberglass prefilter layer that exhibits a Percent Penetration of greater than 90.

4. The pleated filter element of claim 1 wherein a ratio of a Gurley Stiffness of the additional layer to a Gurley Stiffness of the primary filtration layer, is at least 2.5.

5. The pleated filter element of claim 1 wherein the prefilter layer comprises a thickness of less than 0.6 mm and a pressure drop of less than 3.0 mm of water.

6. The pleated filter element of claim 1 wherein the primary filtration layer comprises a thickness of less than 0.8 mm and a pressure drop of from 6.0 to 14.0 mm of water.

7. The pleated filter element of claim 1 wherein the primary filtration layer is adhesively laminated to the prefilter layer.

8. The pleated filter element of claim 1 wherein the pleated filter media exhibits a pleat height of from five millimeters to thirty millimeters.

9. The pleated filter element of claim 1 wherein the pleated filter media is a rotary-score pleated media that comprises a plurality of score lines on at least one of the a-major upstream face of the pleated filter media and the a major downstream face of the pleated filter media.

10. The pleated filter element of claim 1 wherein the first edge dam comprises a lateral offset of less than 3 mm, and wherein the second edge dam comprises a lateral offset of less than 3 mm.

11. The pleated filter element of claim 1 comprising at least one additional dam of hardened adhesive that is an interior dam located laterally between the first edge dam of hardened adhesive and the second edge dam of hardened adhesive and that extends along the entire longitudinal extent of the pleated filter media.

12. The pleated filter element of claim 1 wherein the pleated filter element consists essentially of the organic polymeric nonwoven primary filtration layer that is laminated to the prefilter layer, the first and second edge dams of hardened adhesive, and one or more optional interior dams of hardened adhesive.

13. The pleated filter element of claim 1 wherein the pleated filter element is conformed into an arcuate shape along a conforming axis that is at least substantially perpendicular to the pleat direction.

14. The pleated filter element of claim 13 wherein the upstream face of the pleated filter media is on a convex side of the pleated filter element and the downstream face of the pleated filter media is on a concave side of the pleated filter element.

15. A filter element housing comprising the filter element of claim 1 installed in an interior thereof, the housing comprising a major housing portion that exhibits at least one major surface with an air-permeable area, and that comprises an interior with a receptacle configured to receive the filter element.

16. The filter element housing of claim 15 wherein at least one additional layer of filtration material that is not a part of the filter element, is installed within the interior of the filter element housing.

17. A respirator comprising a mask body with a filter element housing fluidly connected thereto, the filter element housing comprising a filter element of claim 1 installed therein.

18. The respirator of claim 17 wherein the respirator comprises the a mask body and a remote unit that comprises the filter element housing comprising the filter element installed therein, the remote unit being a powered unit comprising a fan and comprising a supply tube that fluidically connects the remote unit to the mask body, whereby filtered air can be delivered from the remote unit to the mask body.

* * * * *

UNITED STATES PATENT AND TRADEMARK OFFICE
CERTIFICATE OF CORRECTION

| | |
|---|---|
| PATENT NO. | : 11,452,891 B2 |
| APPLICATION NO. | : 16/282774 |
| DATED | : September 27, 2022 |
| INVENTOR(S) | : John Michael Sebastian |

It is certified that error appears in the above-identified patent and that said Letters Patent is hereby corrected as shown below:

In the Claims

Column 26
Line 1, In Claim 9, delete "the a-major" and insert -- the major --, therefor.
Line 1-2, In Claim 9, delete "the a major" and insert -- the major --, therefor.
Line 42 (approx.), In Claim 18, delete "the a mask" and insert -- the mask --, therefor.

Signed and Sealed this
Ninth Day of May, 2023

Katherine Kelly Vidal

Katherine Kelly Vidal
*Director of the United States Patent and Trademark Office*